United States Patent [19]

Batawi

[11] Patent Number: 5,691,075
[45] Date of Patent: Nov. 25, 1997

[54] HIGH TEMPERATURE FUEL CELL

[75] Inventor: Emad Batawi, Winterthur, Switzerland

[73] Assignee: Sulzer Innotec AG, Winterthur, Switzerland

[21] Appl. No.: 640,370

[22] Filed: Apr. 30, 1996

[30] Foreign Application Priority Data

Jun. 13, 1995 [EP] European Pat. Off. ............ 95810390

[51] Int. Cl.⁶ .................................................... H01M 8/06
[52] U.S. Cl. ............................................. 429/32; 429/38
[58] Field of Search .................... 429/34, 19, 26, 429/20, 30, 32, 38

[56] References Cited

FOREIGN PATENT DOCUMENTS 0 437 175  7/1991  European Pat. Off. .
0 490 808  6/1992  European Pat. Off. .

*Primary Examiner*—M. Nuzzolillo
*Attorney, Agent, or Firm*—Townsend and Townsend and Crew LLP

[57] ABSTRACT

A high temperature fuel cell has a planar substantially centrally symmetrical structure. It includes an electrochemically active plate and an interconnector formed as an air heat exchanger. The air infeed positions are arranged at the periphery of the cell. The interconnector is built up in three layers: the middle layer consists of a plate which has at least approximately the same thermal expansion as the electrochemically active plate, and the side layers are formed of metal sheets which are substantially thinner than the plate of the middle layer. The metal sheets have a relief-like structure and are firmly connected to the middle plate via a plurality of contact positions. The metal side sheets are designed for a direct contact with the electrochemically active plate and the corresponding plate of a neighboring cell.

13 Claims, 2 Drawing Sheets

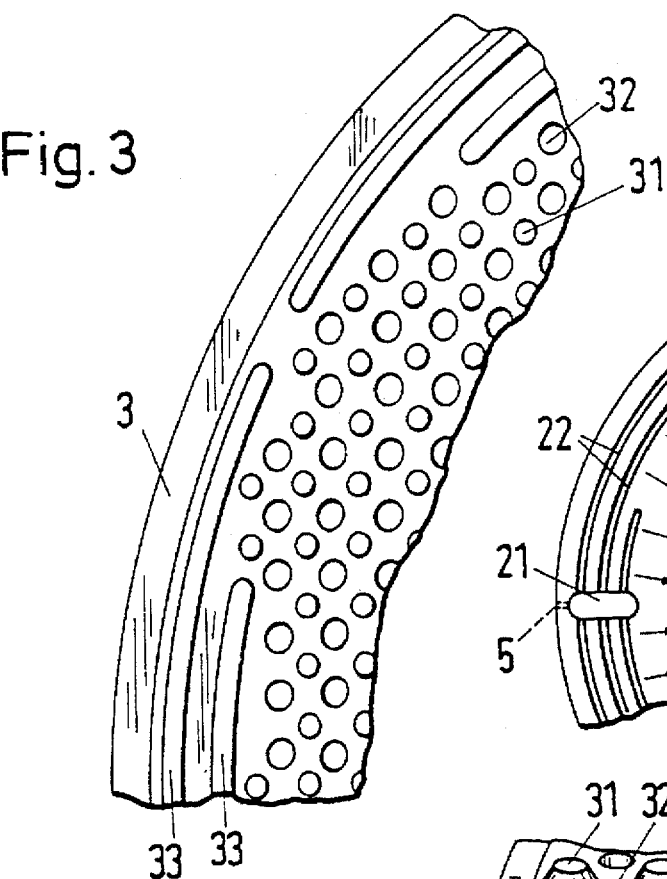
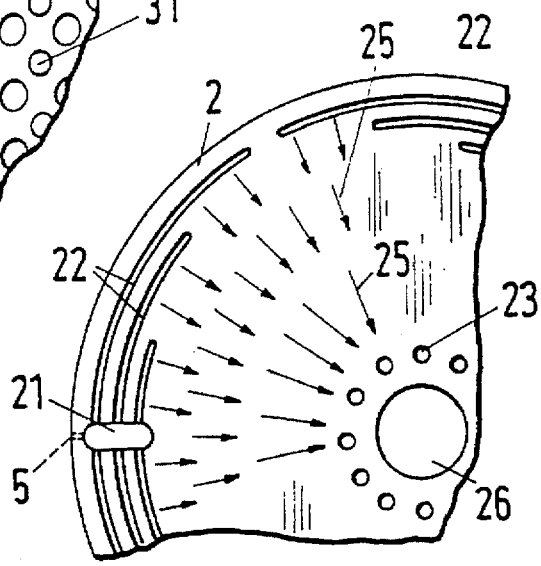
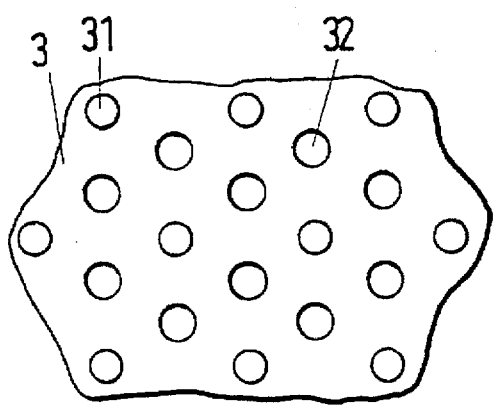
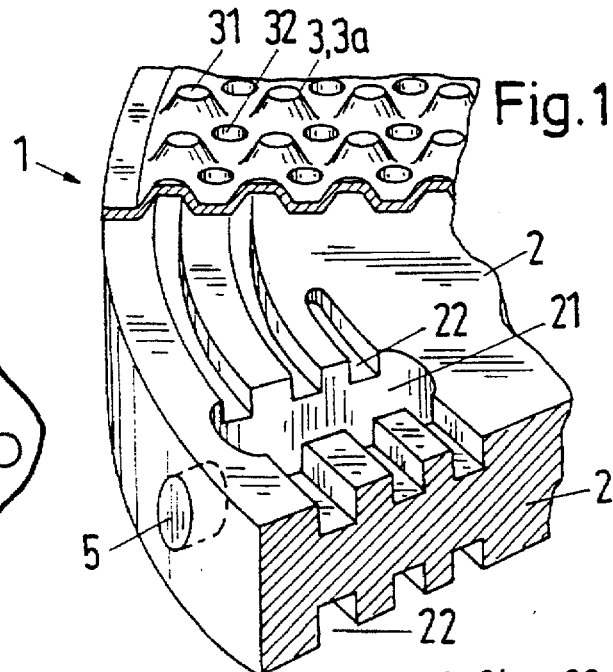
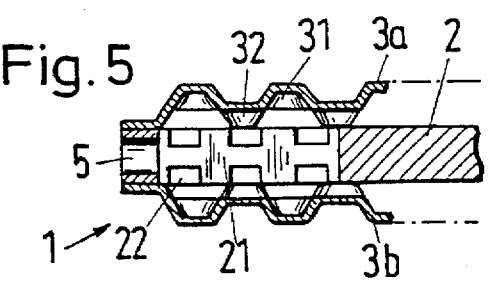
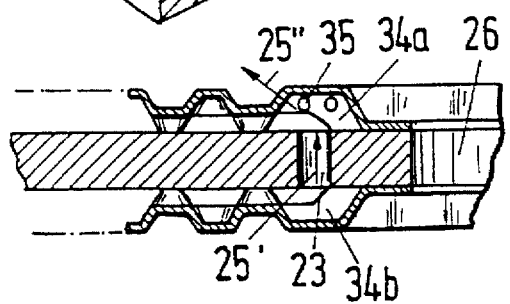

HIGH TEMPERATURE FUEL CELL

BACKGROUND OF THE INVENTION

1. Technical Invention

The invention relates to a high temperature fuel cell for use in a fuel cell battery, and more particularly to a high temperature fuel cell having an interconncetor formed as an air heat exchanger.

2. Description of the Prior Art

Electrical energy is generated from a fuel gas, hereafter referred to briefly as gas, and air oxygen with an electrochemically active plate which, on the one hand, consists of a layer-like, oxide ion conducting, solid electrolyte and, on the other hand, of two electrode layers applied to the electrolyte layer on both sides. In the known centrally symmetrical fuel cell, the gas is supplied centrally and enters into a gas electrode space. The air is fed in at the periphery and is first heated in a disk-like heat exchanger to the temperature necessary for the reaction. It then enters into the air electrode space. The heat exchanger forms a partition wall between the air electrode space of a cell A and the gas electrode space of a neighboring cell B. The heat exchanger is metallic and forms an electrical connection between the air electrode of the cell A and the gas electrode of the cell B via many contact elements. This disk-like heat exchanger, including the contact elements, is referred to as an interconnector.

One embodiment of the known fuel cell (see FIGS. 3 and 5 in EP-A-0 490 808) includes a heat exchanger which consists of two metal sheets. One metal sheet has a relief-like structure and is connected via many regularly arranged contact locations with the other, substantially planar, metal sheet. The electrical contacts to the electrode layers are produced by wires which are bundled group-wise at the heat exchanger.

The material provided for the sheet metal of the heat exchanger, a nickel base alloy, has a different thermal expansion from the electrochemically active plate. As a result of this, disadvantageous characteristic mechanical stresses result in the wires of the contact elements due to the high operating temperatures. In order that these stresses do not have deleterious effects, the individual wires must be made relatively long—compared with their diameter—and this results in a large space requirement. It also results in high costs because the manufacture of this known interconnector is very complicated and expensive.

SUMMARY OF THE INVENTION

The object of the invention is thus to provide a fuel cell with an interconnector which takes up a smaller volume and which can be manufactured at a more favorable cost. According to the present invention, a high temperature fuel cell having a planar, substantially centrally symmetrical structure comprises an electrochemically active plate, and an interconnector formed as an air heat exchanger having air infeed positions arranged at the periphery. The interconnector comprises three layers wherein a middle layer of the three layers consists of a plate that has approximately at least the same thermal expansion as the electrochemically active plate, while side layers of the three layers are formed of metal sheets having uneven surfaces and are thinner than the middle layer plate. The side layers are connected to the middle plate via a plurality of contact positions. Additionally, the side layers are configured such that they have direct contacts with the electrochemically active plate as well as a neighboring cell.

The heat exchanger is built up in three layers in accordance with the invention, and consists of two metal sheets which are structured in relief-like manner and secured to a common middle plate. The structuring can consist of a hexagonal arrangement of raised portions and depressions, such as is shown in FIG. 5 of EP-A-0 490 808. The middle plate is substantially thicker than the two metal sheets and the metal sheets exert—due to their structuring—a relatively small resistance to elastic deformations parallel to the layers of the heat exchanger. Thus the middle plate essentially determines the thermal expansion of this three-layered structure. Because this thermal expansion is, in accordance with the invention, at least approximately the same thermal expansion as exhibited by the electrochemically active plate, this also applies to the heat exchanger formed as an interconnector. The structuring of the metal sheets is arranged in such a way that a direct contact can be produced between electrochemically active plates of neighboring cells without the intermediary of contact elements. Due to the middle plate having the same thermal expansion, as the electrochemically active plate no deleterious stresses arise at the contact locations between the interconnector and the electrochemically active plate on heating up of the fuel cells to the operating temperature.

In accordance with a further aspect of the present invention, the metal plate comprises a metal or metallic alloy.

In accordance with yet another aspect of the present invention, the middle plate comprises a ceramic material.

In accordance with a further aspect of the present invention, the middle plate comprises a composite material.

In accordance with still another aspect of the present invention, the two middle sheets of the side layers are of substantially the same design, with centrally arranged air outlet positions being additionally provided for an air side layer.

In accordance with yet another aspect of the present invention, at least one of the metal sheets is structured with a chessboard-like or hexagonal arrangement of raised portions and depressions.

In accordance with a further aspect of the present invention, at least one of the metal sheets has raised portions similar to channels.

In accordance with still another aspect of the present invention, the raised portions create a structure having a spiral configuration.

In accordance with a further aspect of the present invention, the raised portions have a random arrangement.

In accordance with still another aspect of the present invention, raised portions similar to channels are provided in at least one of the side metal sheets for a distribution of the air fed into the heat exchanger at the periphery.

In accordance with an even further aspect of the present invention, grooves are provided in the middle plate for a distribution of the air fed into the heat exchanger at the periphery.

BRIEF DESCRIPTION OF THE DRAWINGS

FIG. 1 is a partial sectional view of a portion of an interconnector in accordance with the present invention with only a part of one of the two metal sheets and a part of the middle plate being illustrated, FIG. 2 is an elevation view of a portion of a middle plate, FIG. 3 is an elevation view of a metal sheet with a chessboard-like structure, FIG. 4 is an elevation view of a hexagonally structured metal sheet, FIG. 5 is a sectional view through the three-layer interconnector.

DETAILED DESCRIPTION OF THE PREFERRED EXEMPLARY EMBODIMENTS

Figure 6:
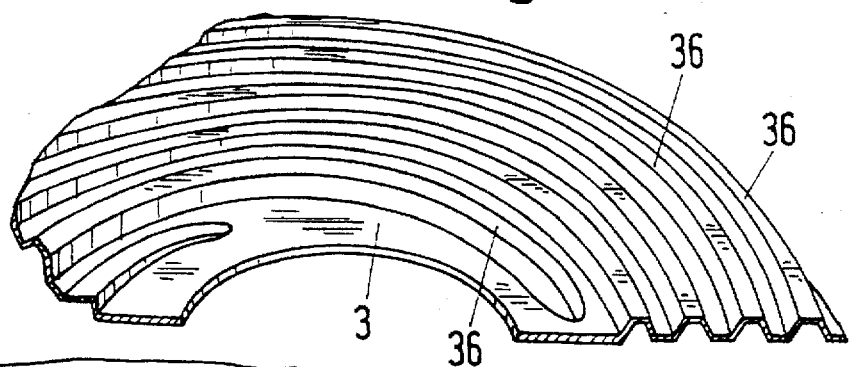
FIG. 6 is an oblique illustration of a sheet metal portion with spiral raised portions.

The interconnector 1 in FIG. 1 is composed of a middle plate 2 and two metal sheets 3 which are structured in a relief-like manner, with only one of the metal sheets 3 (3a or 3b) being shown. The structuring consists of raised portions 31 and depressions 32 arranged in a chessboard-like manner. At least one air infeed location 5 is provided in the middle plate 2—see also FIG. 2. The air first passes into a chamber 21 which is provided by an aperture of the plate 2. Starting from this chamber 21 the air is distributed via grooves 22 along the periphery of the interconnector. In FIG. 2 the arrows 25 represent the air flow. The air flows on both sides of the plate 2.

The air thus passes in two partial flows through the heat exchanger and thereby comes into contact with a heat supplying surface which is formed by the plate 2 and the metal sheet 3a, as well as metal sheet 3b. This heat supplying surface is substantially twice as large as the corresponding contact surfaces of the known fuel cell (EP-A-0 490 808). A correspondingly improved heat transfer thus results.

In the central region the air can change through bores 23 from one side to the other (arrow 25'). The central aperture 26 enables the provision of a central gas infeed (see FIG. 9).

The air can for example also be distributed via channels which are formed by raised portions 33 in the metal sheet 3—see FIG. 3—instead of via grooves 22 in the middle plate 2.

In addition to the channel-like raised portions 33, the metal sheet 3 has raised portions 31 and depressions 32 arranged in chessboard-like manner (see FIG. 1). In FIG. 4, a hexagonal arrangement can be seen in which twice as many depressions 32 are present as raised portions 31. The inverse situation (swapping of the depressions and raised portions), or also other distributions, are naturally possible.

The cross-section of FIG. 5, lies in a plane which extends in FIG. 1 in the radial direction through the air infeed location 5 and the chamber 21. In FIG. 5, the structured metal sheet 3b of the underside can also be seen. The two metal sheets 3a, 3b of the side layers are of substantially the same design. In the central region at the aperture 26, respective ring-like air collecting channels 34a and 34b are provided in the metal sheets 3a and 3b. The air collecting channel 34a of the upper sheet 3a has air outlet positions 35 through which the prewarmed air—arrow 25"—can flow into the air electrode space 41 (see FIG. 9). The arrow 25' shows the flow of air which has been preheated at the underside and passes through the bore 23 to the upper side.

Figure 7:
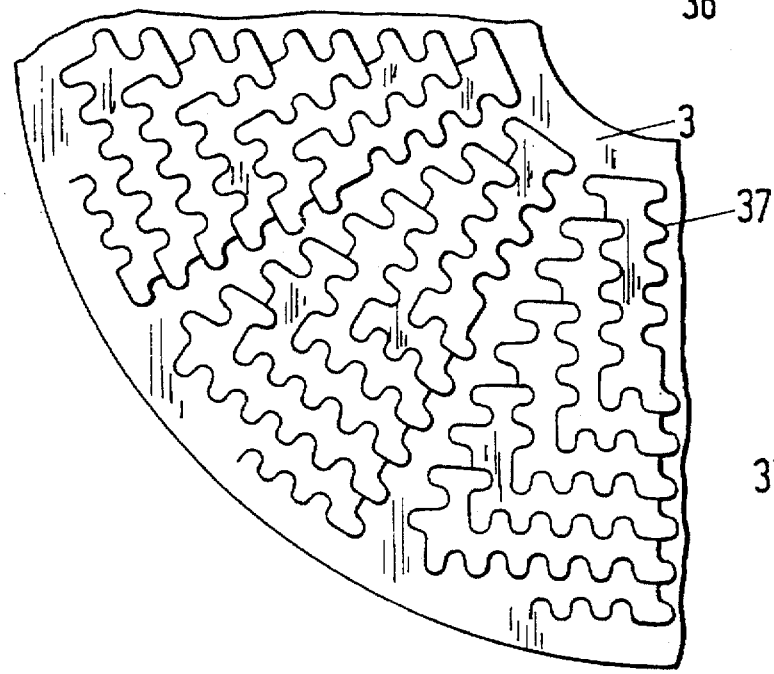
FIG. 7 is a meandering channel structure for the metal sheet.
Figure 8:
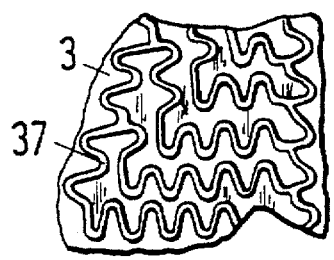
FIG. 8 is a detail of the structure of FIG. 7.

Instead of structuring of the metal sheets 3 with raised portions and depressions, the metal sheets can also be structured with channel-like raised portions. Such raised portions 36 are shown in FIG. 6 where they form a spiral-like arrangement. In FIG. 7, a meandering path of the channel-like raised portions 37 is shown. FIG. 8 represents an enlarged section of this meandering channel arrangement.

Fixed connections are provided between the metal sheets 3a, 3b and the middle plate 2—in particular at the contact locations of the depressions 32. These connections can be produced by soldering or welding.

Figure 9:
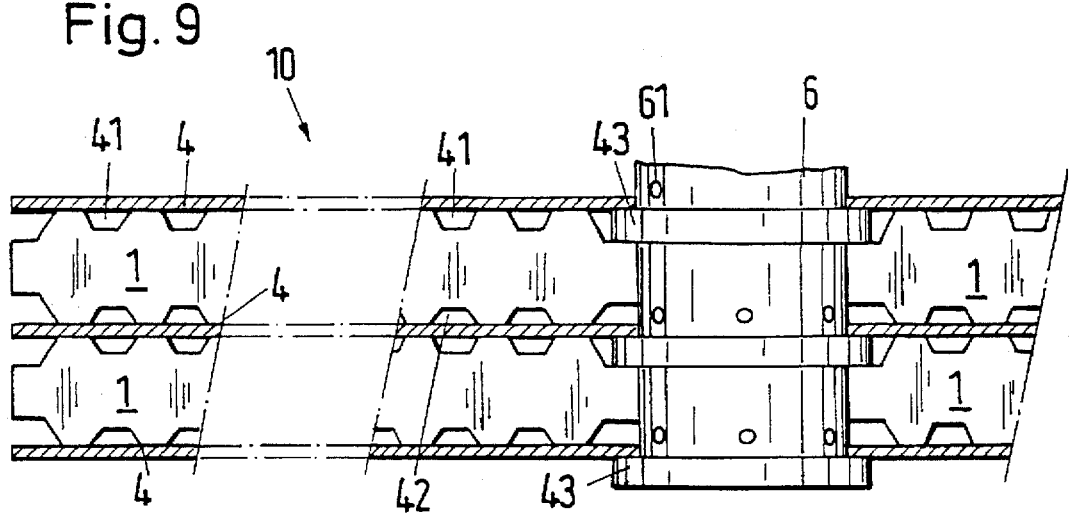
FIG. 9 is a sectional view through two neighboring cells of a fuel cell battery.

FIG. 9 shows the alternating arrangement of interconnectors 1, and electrochemically active plates 4 of a fuel cell battery which includes a stack 10 of fuel cells. The interconnectors 1 which are seen in detail in FIG. 5 are only shown in outline in FIG. 9. The electrochemically active plates 4 which are built up of two electrode layers and an electrolyte layer are also shown in simplified form, namely without the three-layer structure. The air electrodes are located at the undersides of the plates 4. Between the interconnectors 1 and the air electrodes there lies an air electrode space 41. The gas is supplied into the gas electrode spaces 42 via a central tube 6 and the infeed positions 61. Ring-like seals 43 prevent mixing of the gas and air within the cell stack 10.

Plates are available commercially which consist of a metallic alloy which has the same thermal expansion as the electrochemically active plate. These plates can be used as the middle plate of the interconnector of the invention. Since the plates are relatively expensive it is not economical to manufacture the interconnectors from them exclusively.

As a material for the middle plate one can also consider a composite material. This composite material can for example consist of a porous ceramic body, the pores of which are filled with a metallic alloy.

The middle plates can also consist completely of ceramic material. The required electrical connection between the two metal side sheets can be produced at the edge or rim of the plate. Another possibility consists of producing the electrical connection via apertures in the plate which are filled with a metallic phase.

What is claimed is:

1. A high temperature fuel cell having a planar, substantially centrally symmetrical structure and comprising:
    an electrochemically active plate; and
    an interconnector formed as an air heat exchanger having air infeed positions arranged at the periphery, the interconnector comprising three layers;
    wherein a middle layer of the three layers consists of a plate that has approximately at least the same thermal expansion as the electrochemically active plate;
    wherein side layers of the three layers are formed of metal sheets having uneven surfaces and are thinner than the middle layer plate, the side layers being connected to the middle plate via a plurality of contact positions; and
    wherein the side layers are configured such that they have direct contacts with the electrochemically active plate as well as a neighboring cell.

2. A fuel cell in accordance with claim 1, wherein the middle plate comprises a metal or metallic alloy.

3. A fuel cell in accordance with claim 1, wherein the middle plate comprises a ceramic material.

4. A fuel cell in accordance with claim 1, wherein the middle plate comprises a composite material.

5. A fuel cell in accordance with claim 1, wherein the two metal sheets of the side layers are of substantially the same design, with centrally arranged air outlet positions being additionally provided for the air side layer.

6. A fuel cell in accordance with claim 1, wherein at least one of the metal sheets is structured with a chessboard-like or hexagonal arrangement of raised portions and depressions.

7. A fuel cell in accordance with claim 1, wherein at least one of the metal sheets has raised portions similar to channels.

8. A fuel cell in accordance with claim 7, wherein the raised portions create a structure having a spiral configuration.

9. A fuel cell in accordance with claim 7, wherein the raised portions have a meandering arrangement, at least zone-wise.

10. A fuel cell in accordance with claim 1, wherein raised portions similar to channels are provided in at least one of the side metal sheets for a distribution of the air fed into the heat exchanger at the periphery.

11. A fuel cell in accordance with claim 1 wherein grooves are provided in the middle plate for a distribution of the air fed into the exchanger at the periphery.

12. A fuel cell in accordance with claim 10 wherein grooves are provided in the middle plate for a distribution of the air fed into the exchanger at the periphery.

13. A fuel cell battery comprising cells arranged as a stack, each cell having a planar, substantially centrally symmetrical structure and comprising:

an electrochemically active plate; and an interconnector formed as an air heat exchanger having air infeed positions arranged at the periphery, the interconnector comprising three layers;

wherein a middle layer of the three layers consists of a plate that has approximately at least the same thermal expansion as the electrochemically active plate;

wherein side layers of the three layers are formed of metal sheets having uneven surfaces and are thinner than the middle layer plate, the side layers being connected to the middle plate via a plurality of contact positions; and wherein the side layers are configured such that they have direct contacts with the electrochemically active plate as well as a neighboring cell.

* * * * *